United States Patent
Shen et al.

(10) Patent No.: US 11,863,445 B1
(45) Date of Patent: Jan. 2, 2024

(54) PREFIX RANGE TO IDENTIFIER RANGE MAPPING

(71) Applicant: Juniper Networks, Inc., Sunnyvale, CA (US)

(72) Inventors: Yimin Shen, Sherborn, MA (US); Christopher J. Tripp, Krum, TX (US); Brindhavathy Radhakrishnan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 403 days.

(21) Appl. No.: 16/582,329

(22) Filed: Sep. 25, 2019

(51) Int. Cl.
 *H04L 12/00* (2006.01)
 *H04L 45/74* (2022.01)
 *H04L 45/50* (2022.01)
 *H04L 45/02* (2022.01)

(52) U.S. Cl.
 CPC .............. *H04L 45/74* (2013.01); *H04L 45/02* (2013.01); *H04L 45/50* (2013.01)

(58) Field of Classification Search
 None
 See application file for complete search history.

(56) References Cited

U.S. PATENT DOCUMENTS

| | | | | |
|---|---|---|---|---|
| 7,082,102 B1 * | 7/2006 | Wright | ................ | H04L 41/0893 370/229 |
| 8,630,294 B1 * | 1/2014 | Keen | ................... | H04L 45/7453 711/216 |
| 10,339,043 B1 | 7/2019 | Miller | | |
| 2003/0033430 A1 * | 2/2003 | Lau | ...................... | F16H 55/0886 709/245 |
| 2007/0047463 A1 * | 3/2007 | Jarvis | .................. | H04L 45/7457 370/254 |
| 2009/0248841 A1 * | 10/2009 | Tjandra | ................... | H04L 45/02 709/220 |
| 2010/0165929 A1 * | 7/2010 | Berzin | .................... | H04L 45/50 370/329 |
| 2011/0194561 A1 * | 8/2011 | Kompella | ............... | H04L 61/10 370/392 |
| 2012/0144066 A1 * | 6/2012 | Medved | .................. | H04L 45/42 709/242 |
| 2015/0331619 A1 | 11/2015 | Zheng et al. | | |

(Continued)

*Primary Examiner* — Noel R Beharry
*Assistant Examiner* — Lionel Preval
(74) *Attorney, Agent, or Firm* — Harrity & Harrity, LLP

(57) ABSTRACT

A network node may receive an indication of a range of network address prefixes and a corresponding range of sequential identifiers. The network node may generate a policy for mapping respective network address prefixes, having ordered positions within the range of network address prefixes, to respective identifiers having corresponding ordered positions within the corresponding range of sequential identifiers. The network node may discover a device associated with a network address having a network address prefix at an ordered position within the range of network address prefixes. The network node may map, based on the policy, the network address prefix to an identifier having an ordered position within the corresponding range of sequential identifiers, wherein the ordered position within the corresponding range of sequential identifiers corresponds to the ordered position within the range of network address prefixes. The network node may advertise the mapping to one or more neighbor nodes.

20 Claims, 9 Drawing Sheets

(56) References Cited

U.S. PATENT DOCUMENTS

2017/0187624 A1* 6/2017 Goel .................. H04L 45/7453
2018/0212876 A1   7/2018 Bacthu et al.
2019/0215242 A1* 7/2019 Cady .................. H04L 41/0886

* cited by examiner

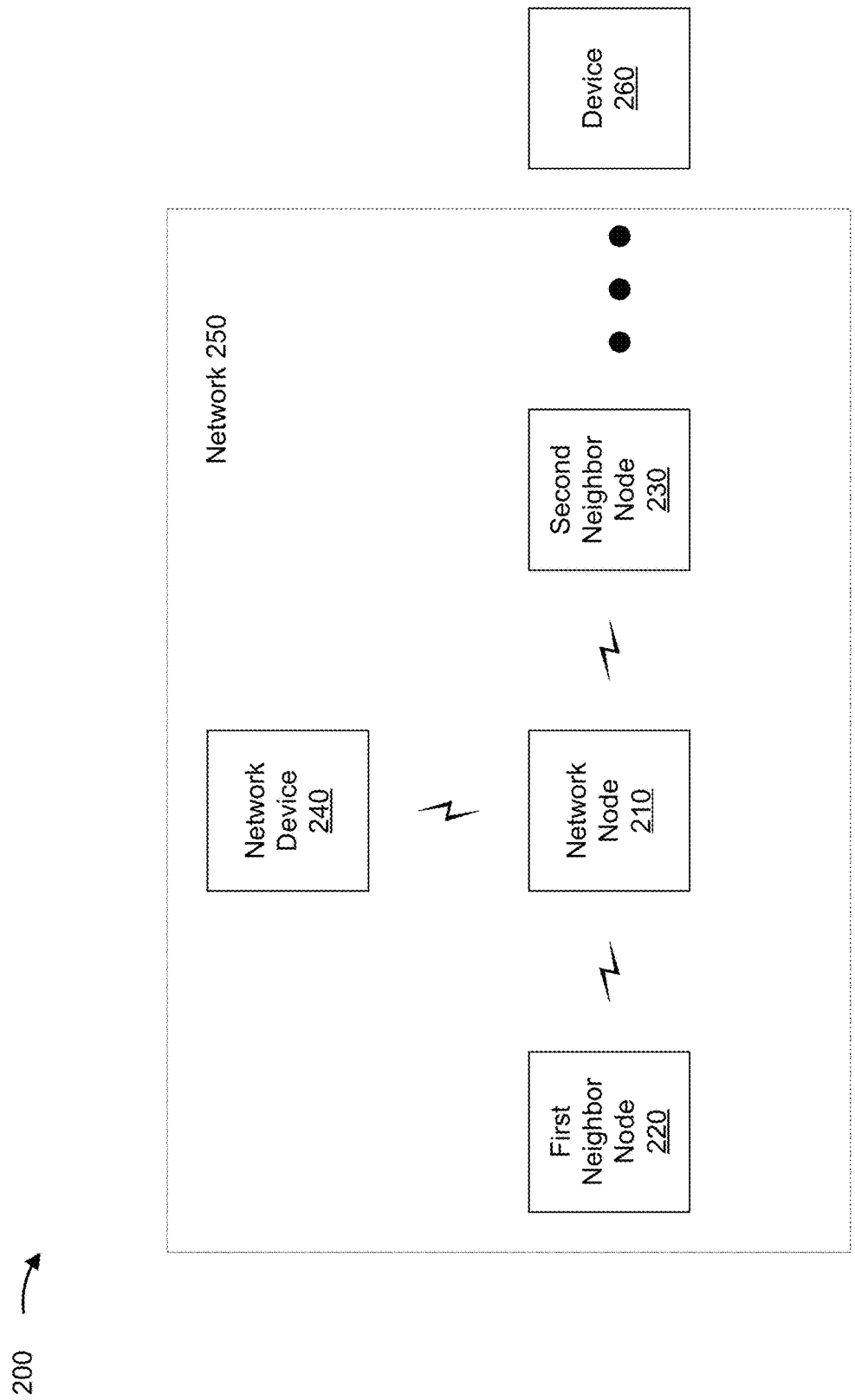

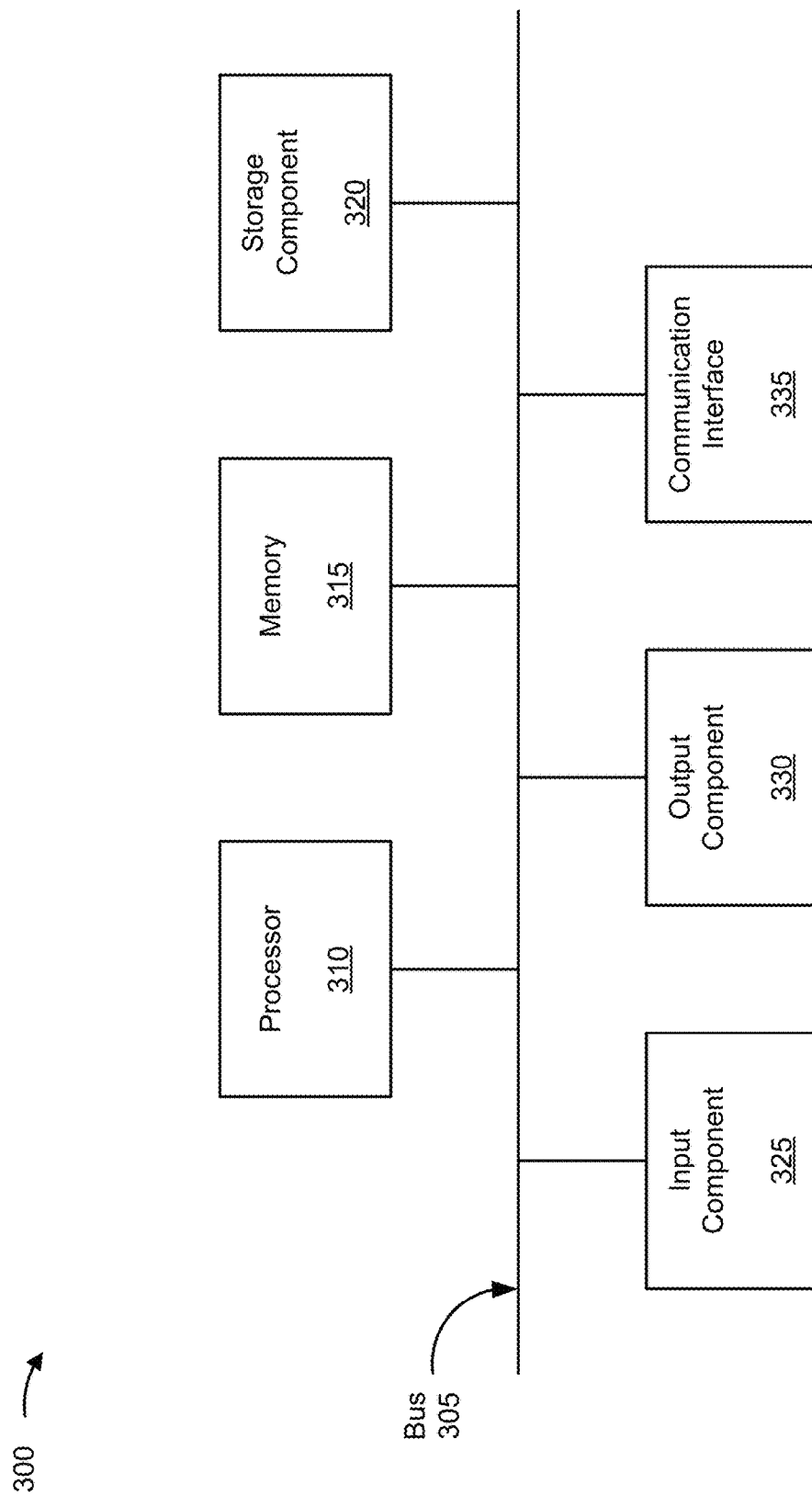

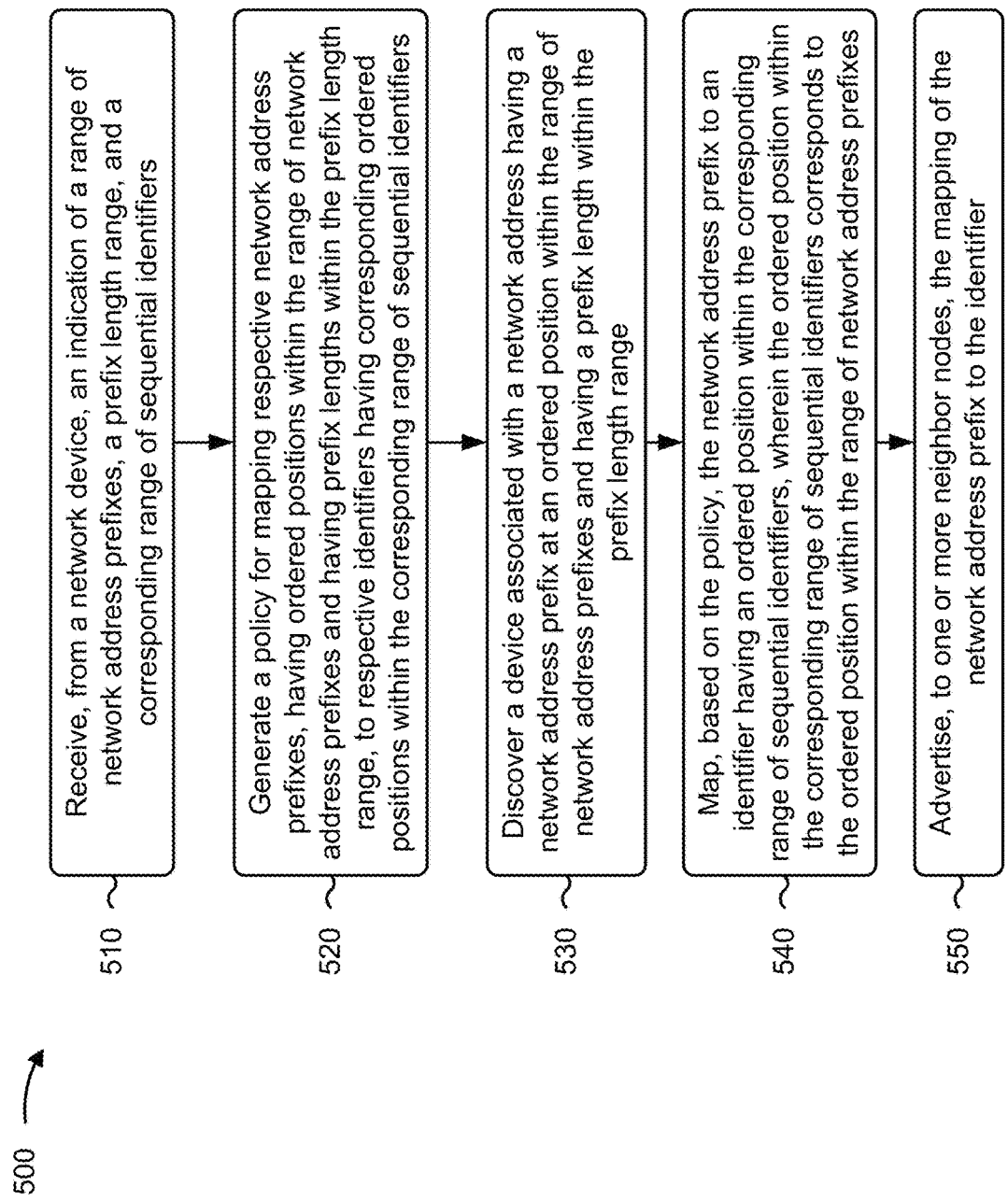

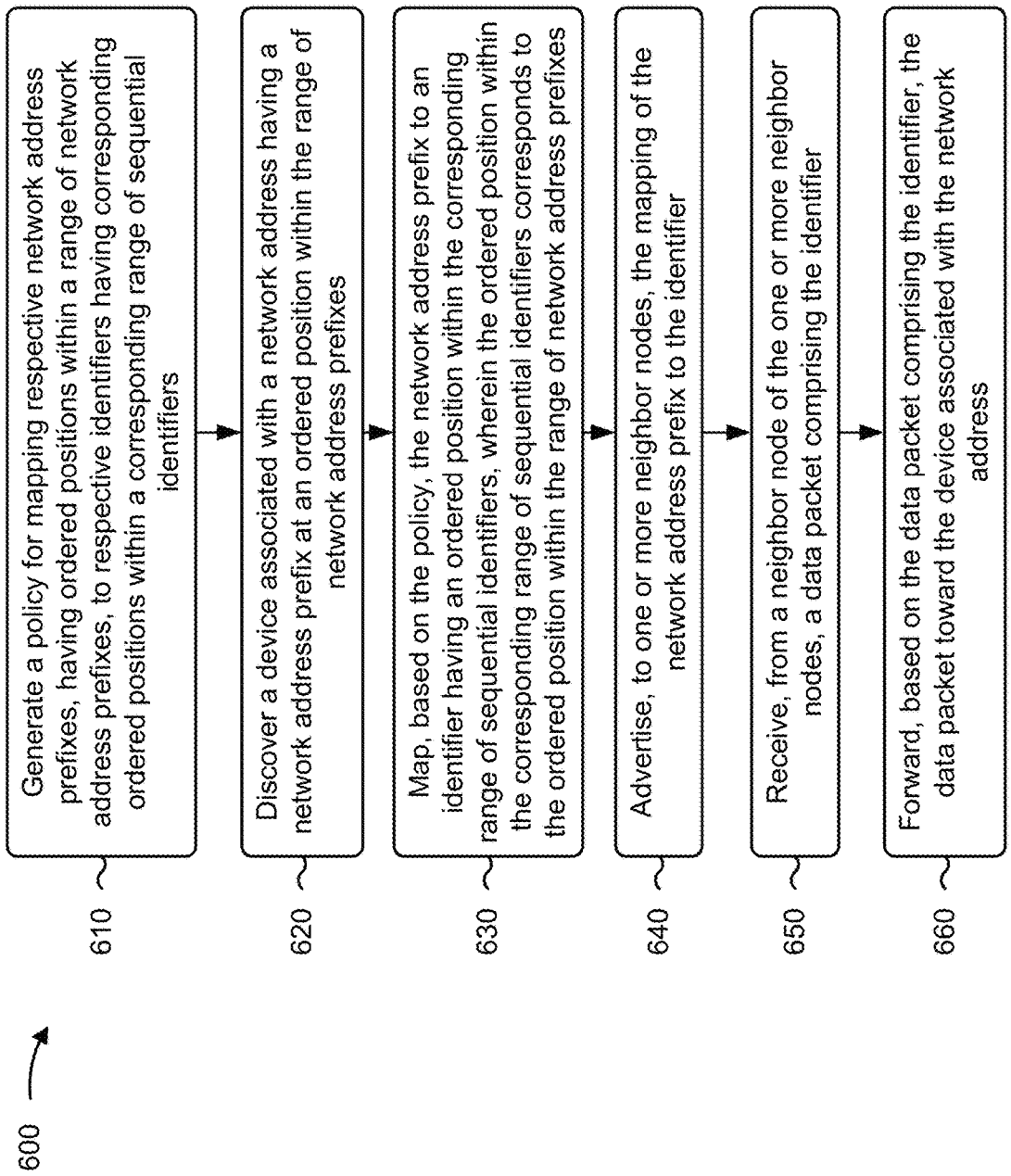

PREFIX RANGE TO IDENTIFIER RANGE MAPPING

BACKGROUND

Some conventional routing procedures involve a plurality of network nodes individually making routing decisions as a data packet arrives. To make a routing decision, regarding where or how to forward the data packet, a network node may inspect a network layer header of the data packet to determine a network address prefix of a destination of the data packet, look up the network address prefix of the destination within a routing table, and forward the data packet to a neighbor node based on an indication in the routing table.

SUMMARY

According to some implementations, a method may include receiving, by a network node, an indication of a range of network address prefixes and a corresponding range of sequential identifiers; generating, by the network node, a policy for mapping respective network address prefixes, having ordered positions within the range of network address prefixes, to respective identifiers having corresponding ordered positions within the corresponding range of sequential identifiers; discovering, by the network node, a device associated with a network address having a network address prefix at an ordered position within the range of network address prefixes; mapping, by the network node and based on the policy, the network address prefix to an identifier having an ordered position within the corresponding range of sequential identifiers, wherein the ordered position within the corresponding range of sequential identifiers corresponds to the ordered position within the range of network address prefixes; and advertising, by the network node and to one or more neighbor nodes, the mapping of the network address prefix to the identifier.

According to some implementations, a network node may include one or more memories; and one or more processors to: receive, from a network device, an indication of a range of network address prefixes, a prefix length range, and a corresponding range of sequential identifiers; generate a policy for mapping respective network address prefixes, having ordered positions within the range of network address prefixes and having prefix lengths within the prefix length range, to respective identifiers having corresponding ordered positions within the corresponding range of sequential identifiers; discover a device associated with a network address having a network address prefix at an ordered position within the range of network address prefixes and having a prefix length within the prefix length range; map, based on the policy, the network address prefix to an identifier having an ordered position within the corresponding range of sequential identifiers, wherein the ordered position within the corresponding range of sequential identifiers corresponds to the ordered position within the range of network address prefixes; and advertise, to one or more neighbor nodes, the mapping of the network address prefix to the identifier.

According to some implementations, a non-transitory computer-readable medium may store one or more instructions. The one or more instructions, when executed by one or more processors of a network node, may cause the one or more processors to: generate a policy for mapping respective network address prefixes, having ordered positions within a range of network address prefixes, to respective identifiers having corresponding ordered positions within a corresponding range of sequential identifiers; discover a device associated with a network address having a network address prefix at an ordered position within the range of network address prefixes; map, based on the policy, the network address prefix to an identifier having an ordered position within the corresponding range of sequential identifiers, wherein the ordered position within the corresponding range of sequential identifiers corresponds to the ordered position within the range of network address prefixes; advertise, to one or more neighbor nodes, the mapping of the network address prefix to the identifier; receive, from a neighbor node of the one or more neighbor nodes, a data packet comprising the identifier; and forward, based on the data packet comprising the identifier, the data packet toward the device associated with the network address.

BRIEF DESCRIPTION OF THE DRAWINGS

FIG. 2 is a diagram of an example environment in which systems and/or methods described herein may be implemented.

FIGS. 3A and 3B are diagrams of example components of one or more devices of FIG. 2.

FIGS. 4-6 are flowcharts of example processes for mapping a prefix range to an identifier range.

DETAILED DESCRIPTION

Figure 1A:
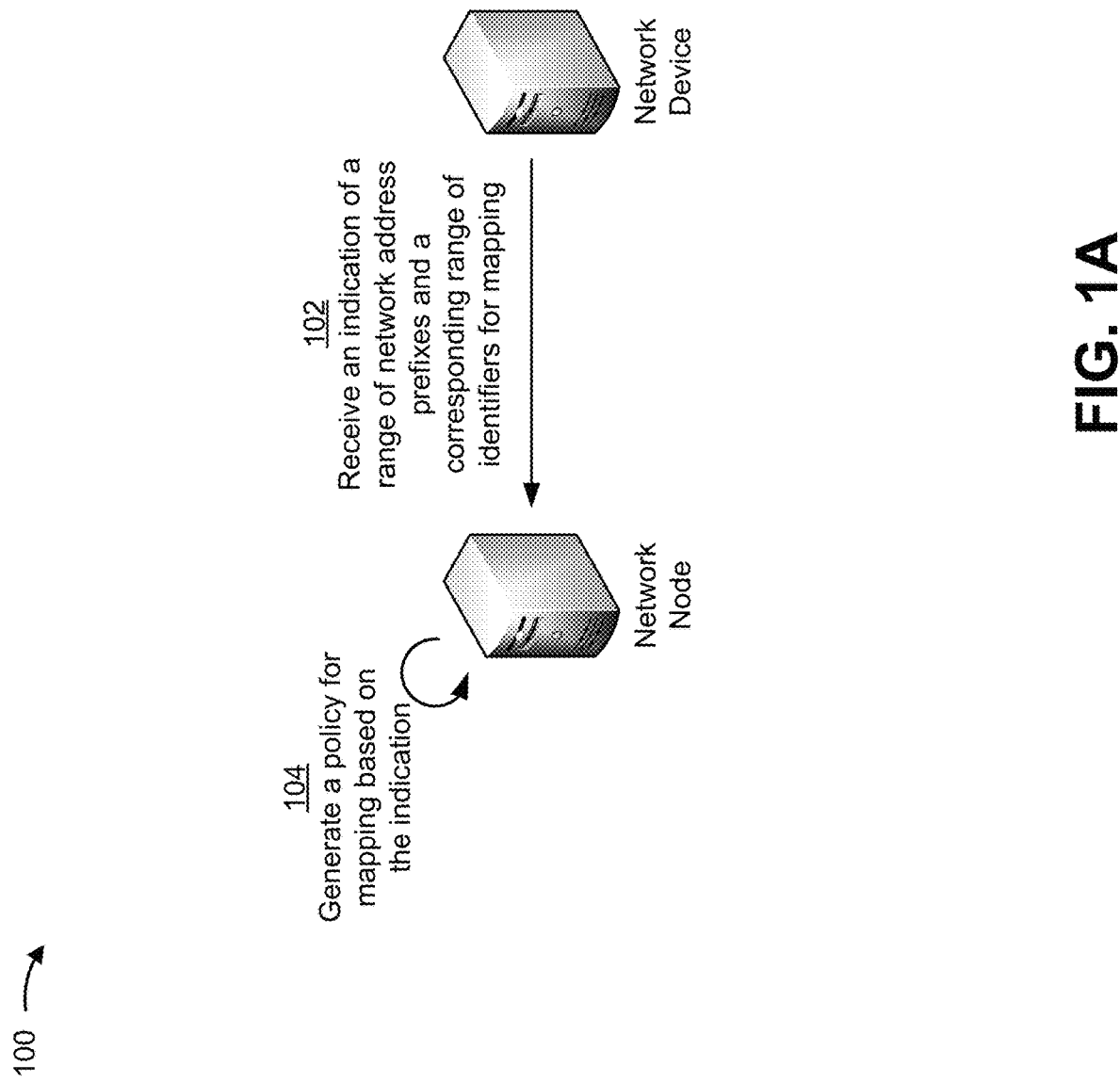
FIGS. 1A-1C are diagrams of one or more example implementations described herein.

The following detailed description of example implementations refers to the accompanying drawings. The same reference numbers in different drawings may identify the same or similar elements.

Some techniques for routing data packets in a network may include mapping a network address prefix (e.g., an internet protocol (IP) prefix) to an identifier (e.g., a label, an ID, and/or the like). The identifier may define, for the plurality of network nodes, a forwarding procedure for the packet. This may remove a need for each of the network nodes to inspect the network layer header of the data packet and may reduce an amount of computation performed by each of the of the plurality of network nodes to determine the forwarding procedure.

A multiprotocol label switching (MPLS) technique, for instance, involves mapping a network address prefix to an MPLS label to identify routing procedures within an MPLS network. When a network node (e.g., a label edge router (LER), a label switch router (LSR), and/or the like) discovers a device associated with a network address prefix, the network node may map the network address prefix to an MPLS label. The network node may advertise the mapping, which may indicate to other network nodes in the MPLS network that the device associated with the network address prefix is available via the network node. The advertised mapping also indicates, to the other network nodes in the MPLS, that data packets intended for the device associated with the network address prefix may include the MPLS label, so that the network node will forward the data packets toward the device associated with the network address prefix. When the network node receives a data packet having the network address prefix, the network node may use the MPLS label to look up a routing procedure, which may indicate a next hop for routing the data packet and may indicate a new MPLS label for the data packet. The MPLS label may be based on an advertised mapping of the network address prefix to the new MPLS as received from a neighbor node associated with the next hop. The data packet may be forwarded across the MPLS network on a label switched path, based on MPLS labels.

A segment routing network may use a process of mapping network address prefixes to a segment routing global block (SRGB) of segment identifiers (SIDs) to identify routing procedures within the segment routing network. Some of the SIDs may relate to instructions for routing data packets through segments (e.g., sub-paths of a total path through the segment routing network) between network nodes of the segment routing network. Multiple segments may be combined to form the total path through the segment routing network. A prefix SID may identify a path or sub-path based on a network address prefix of a destination network node. A node SID may identify the destination network node based on the network address prefix of the destination network node.

However, conventional mapping of a network address prefix to an identifier may be selected dynamically and unpredictably. By having unpredictable identifier mappings, the network may risk mapping an identifier to multiple network address prefixes, which may result in incorrectly routing through the network. This may result in unnecessary consumption of computing resources (e.g., processor resources, memory resources, communication resources, and/or the like) of network nodes and consumption of network resources as data packets are incorrectly forwarded by one or more network nodes of the network.

Additionally, if a network is changed (e.g., by adding or removing network nodes or segments), a mapping process may need to be performed again for each network node. This may consume computing resources used to generate new identifier mappings and may consume network resources to advertise the new identifier mappings throughout the network.

Additionally, the unpredictable mappings may result in an inefficient use of SRGBs because of unused identifiers within the SRGBs, since the network generates mappings from network address prefixes to nonsequential identifiers.

According to some implementations described herein, a network node may be configured with a policy to map network address prefixes within a range of network address prefixes to identifiers within a range of identifiers. For example, the network node may receive an indication of a range of network address prefixes and a range of identifiers to which the range of network address prefixes are to be mapped when the network node discovers a device associated with a network address prefix within the range of network address prefixes. The network node may generate a policy for mapping network address prefixes in the range of network address prefixes to identifiers in the range of identifiers. For example, the policy may indicate that a particular network address prefix, having an ordered position within the range of network address prefixes, is to be mapped to a particular identifier, based on the particular identifier having an ordered position within the range of identifiers that corresponds to the ordered position within the range of network address prefixes. For example, a network address prefixes that is in the sixth position of the range of network address prefixes may be mapped to an identifier that is in the sixth position of the range of identifiers.

The policy may be applied to map a network address prefix associated with a device that is discovered by the network node. For example, the network node may receive an advertisement from a neighbor node, the advertisement including the network prefix associated with the device and indicating that the device can be forwarded data via the neighbor node. The network node may receive the advertisement and perform the mapping based on the policy.

By using the policy to map network address prefixes to identifiers, computing resources and network resources may be conserved which might otherwise be used to generate new identifiers when a network changes, check for duplication of mappings, recover from incorrect routing, and/or the like. Additionally, by using the policy to map network address prefixes to identifiers only after a need arises (e.g., when the network node discovers a device having a network address prefix within the range of network address prefixes), the network node may conserve computing resources that would otherwise be used to generate and store mappings for network addresses that are not accessible via the network node. This may also improve latency by reducing entries in a data structure storing the mappings, where the data structure may be queried when the network node receives a data packet with an identifier.

Figure 1B:
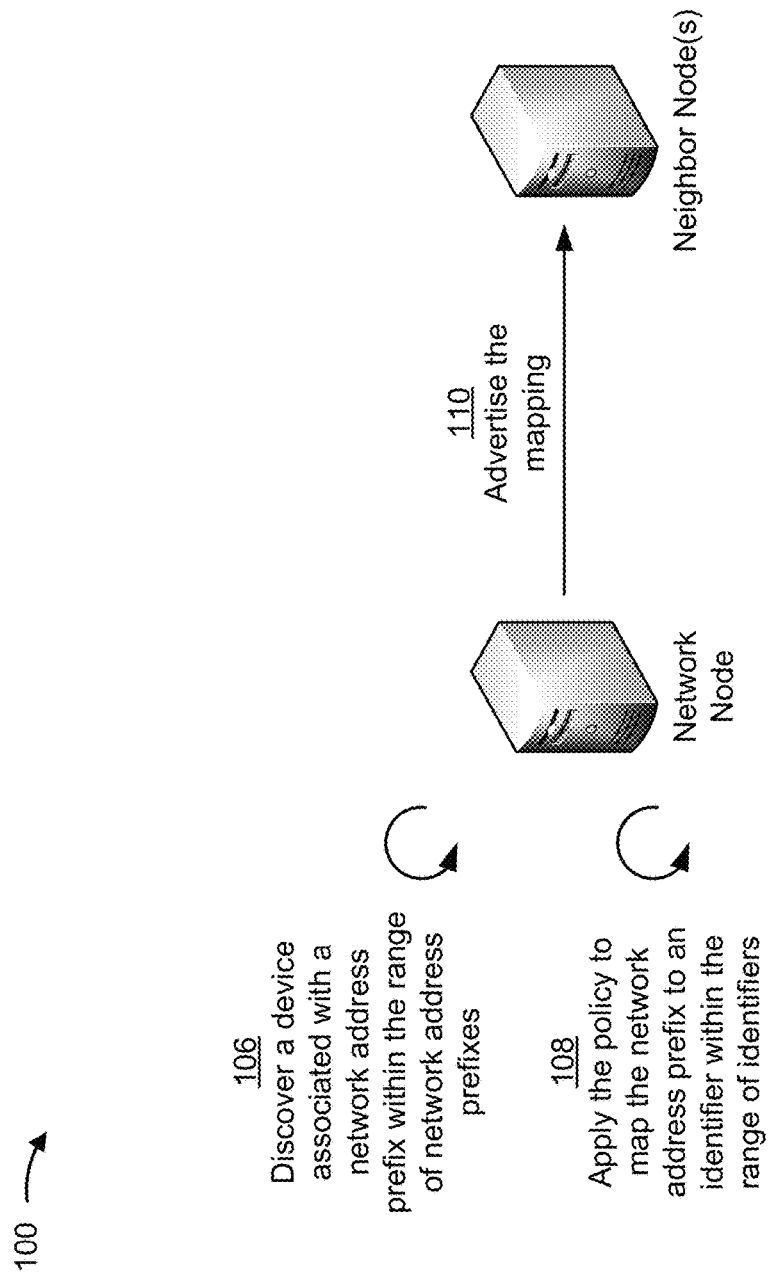
Figure 1C:
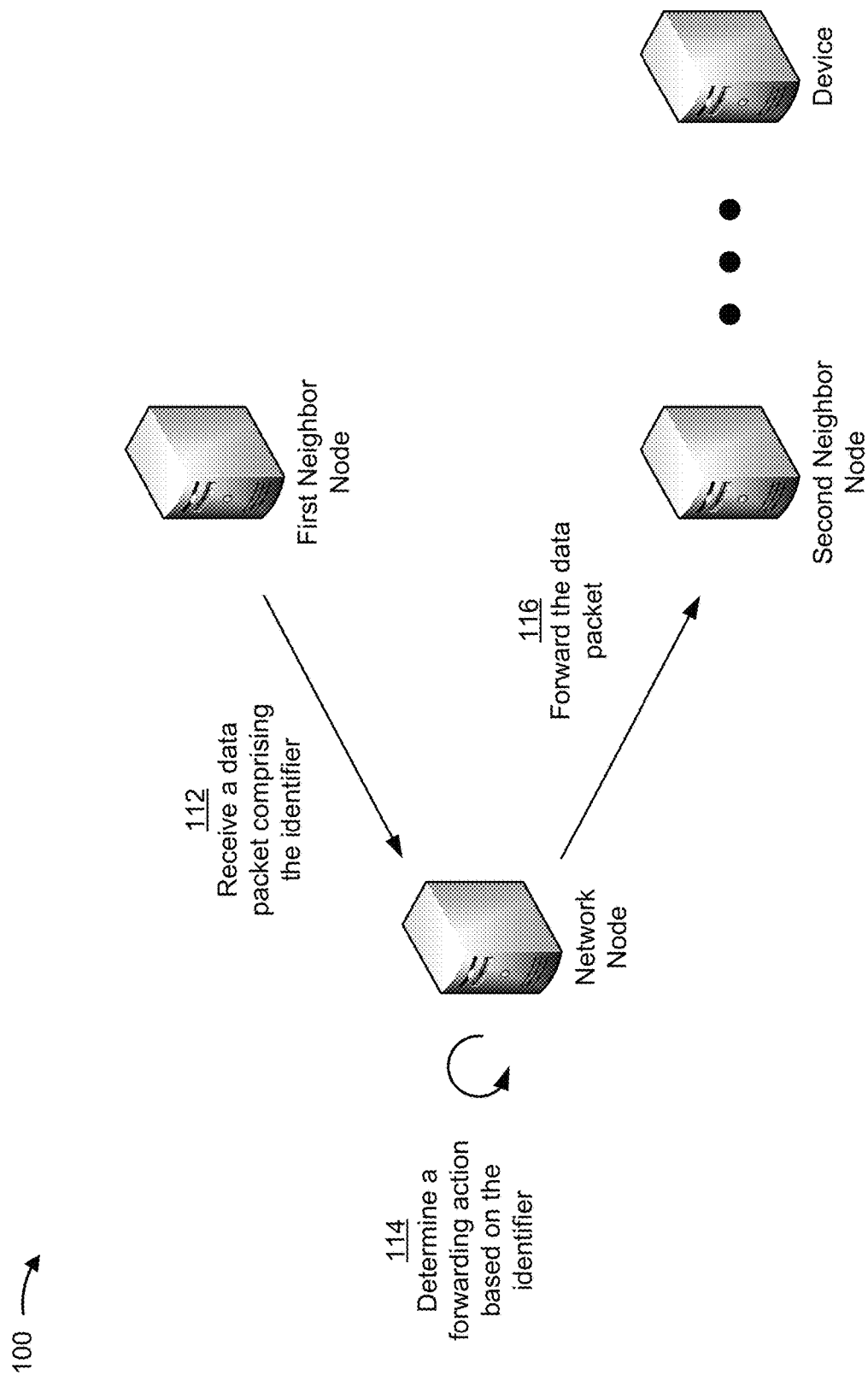

FIGS. 1A-1C are diagrams of one or more example implementations 100 described herein. As shown in FIGS. 1A-1C, the example implementation(s) 100 may include a network node, a network device, one or more neighbor network nodes, a device associated with a network address, and/or the like. The network node, network device, and/or neighbor network nodes may comprise hardware, firmware, or a combination of hardware and software and may be, for example, switches, routers, security devices, devices implementing virtual machines, cloud computing resources, and/or the like.

As shown in FIG. 1A, and by reference number 102, the network node may receive an indication of a range of network address prefixes and a corresponding range of identifiers for mapping. The network node may comprise a label edge router, a label switch router, and/or the like, which may be used to forward and/or route data packets through a network. The network node may be associated with a network address prefix and/or may be configured to discover devices associated with network address prefixes.

In some implementations, the network node may receive the indications via a network device, such as a device associated with provisioning the network node. The network device may provide the indication as part of an initial provisioning process, an upgrading process, or based on receiving input from another device to provide the indication. In some implementations, the network device receives, from a network administrator, input that defines the range of network address prefixes and the corresponding range of identifiers.

In some implementations, an identifier of the range of identifiers may comprise an MPLS label for use in an MPLS domain, an SID for use in a network implementing segment routing procedures, and/or the like. In some implementations, the identifier may be an integer that can be used to represent a network address prefix in any type of network for any purpose.

The range of identifiers may be defined by a lowest-ordered identifier (e.g., a first identifier in a sequentially ordered range) and a highest-ordered identifier (e.g., a last identifier in the sequentially ordered range). In some implementations, the range of identifiers may be defined by the lowest-ordered identifier, with the range further defined to have a quantity of identifiers based on a quantity of network address prefixes in the range of network address prefixes. For example, the definition of the range of identifiers may be based on a lowest-ordered identifier, a highest-ordered identifier, and/or the like, and based on the range of network address prefixes. In some implementation, the range of identifiers may include a range of sequential identifiers, which may be integers.

The range of network address prefixes may be in the form A.B.C.D/L0 and/or may relate to internet protocol version 4, internet protocol version 6, and/or the like. A range in the form A.B.C.D/L0 includes network address prefixes having a first quantity L0 of bits that match the first quantity L0 of bits of the A.B.C.D/L0 network address prefix (e.g., in binary form). The indication may further define the range of network address prefixes by a prefix length range from a lower end L1 to a higher end L2. The prefix length range may further define the range of network address prefixes as including those within the range A.B.C.D/L0 and having a prefix length L that is between L1 and L2. The network address prefixes within the range of network address prefixes may correspond to identifiers within the range of identifiers with a one-to-one correlation.

As shown by reference number 104, the network node may generate a policy for mapping network address prefixes to identifiers based on the indication. For example, the policy may include instructions for mapping network address prefixes, including those within the range of network address prefixes, to identifiers, including those within the range of identifiers.

The policy may be used to map a network address prefix to a corresponding identifier only when the network address, or a device associated with the network address, is discovered to be directly or indirectly accessible to the network node. In other words, the policy may not require that the network node determines a mapping for a network address prefix within the range of network address prefixes until a need arises (e.g., when the network node discovers that a device associated with the network address prefix is accessible). In this way, the network node may generate predictable mappings without determining the mappings for each network address prefix within the range of network address prefixes, storing the mappings in an unnecessarily large data structure, advertising the mappings to neighbor nodes, and/or the like. This may conserve computing resources of the network node and/or network resources of the network. Additionally, this may conserve computing resources and improve latency for the network because the network node can, when a data packet comprising an identifier arrives, search a relatively small set of entries within a data structure storing mappings, for only the network address prefixes for devices that are accessible to the network node.

As shown in FIG. 1B, and by reference number 106, the network node may discover a device associated with a network address having a network address prefix within the range of network address prefixes. In some implementations, the network address has a prefix length within the prefix length range. In some implementations, the network address prefix may be associated with an ordered position within the range of network address prefixes. For example, the network address prefix may be associated with a sixth ordered position of the range of network address prefixes.

As shown by reference number 108, the network node may apply the policy to map the network address prefix to an identifier within the corresponding range of identifiers. The network node may apply the policy to map the network address prefix based on the network address prefix being within the range of network address prefixes and/or based on the network address prefix having a length within the prefix length range. The identifier may be associated with an ordered position within the range of sequential identifiers that corresponds to the ordered position of the network address prefix within the range of network address prefixes.

To perform the mapping, the network node may determine an index of the network address prefix within the range of network address prefixes, where the index indicates, for the network address prefix, the ordered position within the range of network address prefixes. For example, if the ordered position of the network address prefix is sixth, the index may be five, to indicate that the network address is five positions away from a lowest-ordered network address prefix of the range of network address prefixes.

In some implementations, the network node determines the identifier based on a sum of the index and a lowest-ordered identifier, which has a lowest-ordered position of the range of identifiers. The lowest-ordered identifier may be defined in a range [X, Y] as X. For example, if the lowest-ordered identifier is 1,000 and the index is five, the identifier is 1,005, which is the sixth ordered position within the range of identifiers.

In an example mapping procedure, a range of network address prefixes is defined as 1.1.0.0/16. Here, L=16 and a first part of a determination of whether a network address prefix is within the range of network address prefixes includes determining if a network address prefix is in the form 1.1.C.D/L, where L>16. For the example, the range of identifiers [X, Y] is defined as [1,000, Y], where 1,000 is the lowest-ordered identifier, and Y is to be based on a quantity of internet address prefixes within the range 1.1.0.0/16.

For this example, the prefix length range is defined as L1=25 to L2=28. This means that a second part of a determination of whether a network address prefix is within the range of network address prefixes includes determining if a length L of the network address prefix is between 25 and 28.

In the example, the network node discovers a first device associated with a first network address having a first network address prefix 1.1.1.3/32. The network node may determine that the first network address prefix is in the form 1.1.C.D/L, where L>16. This satisfies the first part of the determination. However, the network node may determine that the prefix length L is not within the prefix length range because L>L2. Because 1.1.1.3/32 is not within the prefix length range, the network node may map the first network address prefix to an identifier outside of the range of identifiers.

In the example, the network node discovers a second device associated with a second network address having a second network address prefix 1.1.3.0/25. The network node may determine that the second network address prefix is in the form 1.1.C.D/L, where L>16. Additionally, the network node may determine that the prefix length L is within the prefix length range because L1>L>L2. This means that the network node has determined that the second network address prefix will be mapped to an identifier within the range of identifiers. The network node may map the second network address prefix to an identifier within the range of identifiers based on the ordered position of the second network address prefix within the range 1.1.0.0/16.

In an example process for determining the ordered position of the second network address prefix, the network node may determine an index of the second network address prefix. In an example, the index may be determined as a sum of a base index B and an index offset S. The base index B may be defined as $$B = P \ \& \ (2^{32-L0} - 1) \gg (32-L),$$

where P is 1.1.3.0, L is 25, & is a bit and operator, and $\gg$ is a shift of 32−L bits to the right in binary form.

The index offset S may be defined as:

$S = 2^{L-L_0} - 2^{L_1-L_0}$.

Evaluating the definition of B results in:

$B = P \ \& \ (2^{32-16}-1) \gg (32-25)$;

$B = 1.1.3.0 \ \& \ 0\text{XFFF} \gg (7)$;

$B = 0.0.3.0 \gg 7$;

$B = 00000000.00000000.00000011.00000000 \gg 7$ $B = 00000000.00000000.00000000.00000110 = 6$

Evaluating the definition of S results in:

$S = 2^{25-16} - 2^{25-16} = 0$

The index is equal to the sum of B+S=6. The identifier may be determined as a sum of the index and the lowest-ordered identifier. Therefore, the identifier is 1,000+6=1006, which is mapped to the second network address prefix 1.1.3.0/25. Other example mappings from the above example may, if the network node discovers devices associated with the listed network addresses, include the following pairs: (1.1.0.0/25, 1000), (1.1.0.128/25, 1001), (1.1.1.0/25, 1002), (1.1.1.128/25, 1003), (1.1.2.0/25, 1004), (1.1.2.128/25, 1005), (1.1.3.0/25, 1006), . . . (1.1.255.0/25, 1510), (1.1.255.128/25, 1511), (1.1.255.128/25, 1512), (1.1.0.0/26, 1512), (1.1.0.64/26, 1513), (1.1.0.128/26, 1514), (1.1.0.192/26, 1515).

As shown in FIG. 1C, and by reference number 112, the network node may receive, from a first neighbor node, a data packet comprising the identifier. In some implementations, the first neighbor node may provide the data packet comprising the identifier based on the first neighbor node receiving the advertisement from the network node indicating the mapping.

As shown by reference number 114, the network node may determine a forwarding action based on the identifier. For example, the network node may locate the identifier in a data structure to determine the forwarding action. The network node may determine the forwarding action to include removing the identifier, replacing the identifier with a new identifier, forwarding the data packet toward the network address identified by the network address prefix via an identified segment, forwarding the data packet toward the network address identified by the network address prefix via a receiving network node, forwarding the data packet to a network identified by the network address prefix, and/or the like. In some implementations, the network node may replace the identifier with the new identifier based on an advertised mapping of the network address prefix to the new identifier by the receiving network node.

As shown by reference number 116, the network node may forward the data packet to a second neighbor node. The second neighbor node may perform a similar process of determining a forwarding action based on the new identifier. The data packet may continue to be forwarded within the network until it reaches the device associated with the network address or a device associated with a network that is associated with the network address (e.g., a router, switch, and/or the like that is local to the device associated with the network address).

In some implementations, each network node of the network (e.g., the network node, the one or more neighbor network nodes, and/or the like) may receive different indications of ranges of network address prefixes and corresponding ranges of identifiers for mapping. In some implementations, some or all of the network nodes of the network receive a same indication of a range of network address prefixes and a corresponding range of identifiers for mapping. In some implementations, a network device may perform the mapping for one or more of the network nodes of the network and/or may provide the mappings to the network nodes of the network.

As indicated above, FIGS. 1A-1C are provided merely as one or more examples. Other examples may differ from what is described with regard to FIGS. 1A-1C.

FIG. 2 is a diagram of an example environment 200 in which systems and/or methods described herein may be implemented. As shown in FIG. 2, environment 200 may include a network node 210, a first neighbor node 220, a second neighbor node 230, a network device 240, a network 250, and a device 260. Devices of environment 200 may interconnect via wired connections, wireless connections, or a combination of wired and wireless connections.

Network node 210 includes one or more devices capable of receiving, storing, generating, processing, forwarding, and/or transferring information, such as data packets. For example, network node 210 may include a switch, a router, a security device, one or more devices implementing virtual machines, cloud computing resources, a gateway, a bridge, a network interface controller (NIC), and/or the like. In some implementations, network node 210 may be a physical device implemented within a housing, such as a chassis. In some implementations, network node 210 may be a virtual device implemented by one or more computer devices of a cloud computing environment or a data center.

First neighbor node 220 includes one or more devices capable of receiving, storing, generating, processing, forwarding, and/or transferring information, such as data packets. For example, first neighbor node 220 may include a switch, a router, a security device, one or more devices implementing virtual machines, cloud computing resources, a gateway, a bridge, an MC, and/or the like. In some implementations, first neighbor node 220 may be a physical device implemented within a housing, such as a chassis. In some implementations, first neighbor node 220 may be a virtual device implemented by one or more computer devices of a cloud computing environment or a data center.

Second neighbor node 230 includes one or more devices capable of receiving, storing, generating, processing, forwarding, and/or transferring information, such as data packets. For example, second neighbor node 230 may include a switch, a router, a security device, one or more devices implementing virtual machines, cloud computing resources, a gateway, a bridge, an MC, and/or the like. In some implementations, second neighbor node 230 may be a physical device implemented within a housing, such as a chassis. In some implementations, second neighbor node 230 may be a virtual device implemented by one or more computer devices of a cloud computing environment or a data center.

Network device 240 includes one or more devices capable of receiving, storing, generating, processing, forwarding, and/or transferring information, such as control information for configuring mapping policies to one or more of network node 210, first neighbor node 220, second neighbor node 230, and/or the like. For example, network device 240 may include a bootstrap device, such as a server device, a collection of server devices, one or more computing resources of a cloud computing environment, a device within a data center, and/or the like. In some implementations, network device 240 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device that can provide input (e.g., the indication of the range of network address prefixes and/or the range of identifiers) to network node 210 and/or other network nodes in the network 250. In some implementations, network device 240 may be a physical device implemented within a housing, such as a chassis. In some implementations, network device 240 may be a virtual device implemented by one or more computer devices of a cloud computing environment or a data center.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Device 260 may be a device on another network configured to provide and/or receive data packets via the network 250. Device 260 is associated with a network address and a network address prefix, which identifies device 260 to the network 250 and/or other devices. Device 260 may include a server device, a router, a switch, one or more computing resources of a cloud computing environment, a device within a data center, and/or the like. In some implementations, device 260 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device that can communicate over the network 250.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3A is a diagram of example components of a device 300. Device 300 may correspond to network node 210, first neighbor node 220, second neighbor node 230, network device 240, and/or device 260. In some implementations, network node 210, first neighbor node 220, second neighbor node 230, network device 240, and/or device 260 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
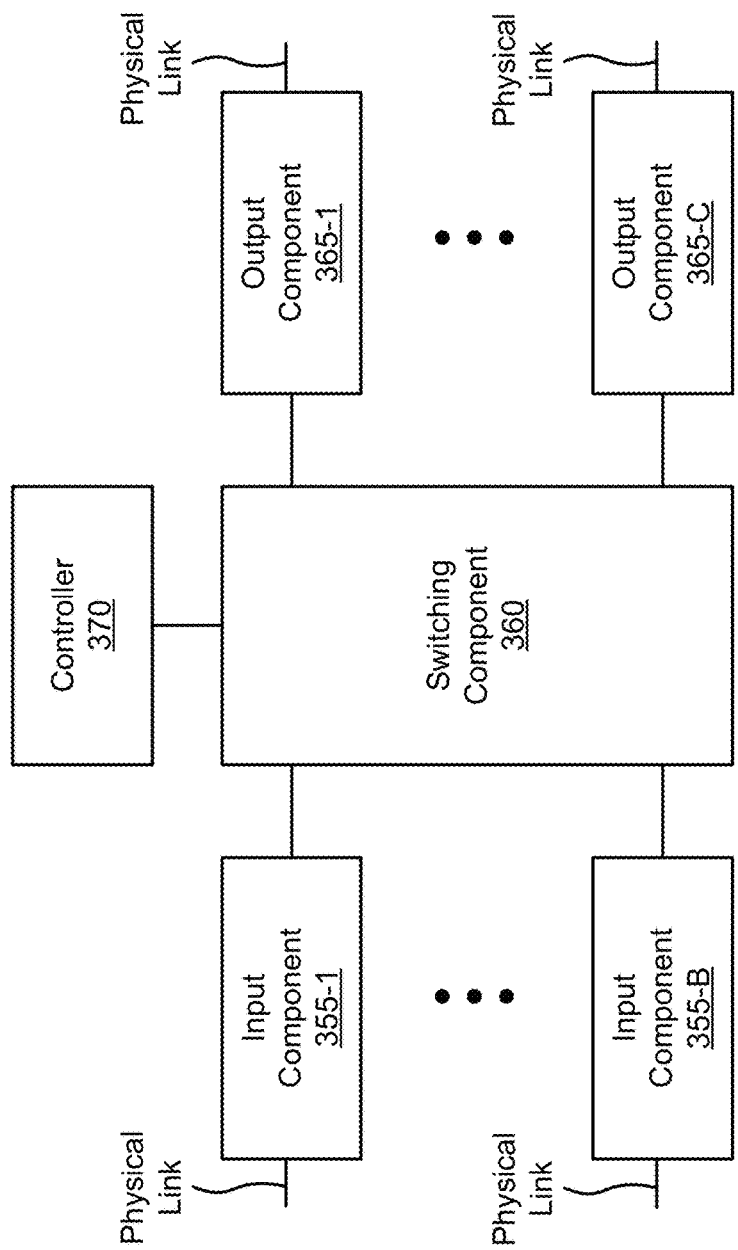

FIG. 3B is a diagram of example components of a device 350. Device 350 may correspond to one or more of network node 210, first neighbor node 220, second neighbor node 230, network device 240, and/or device 260. In some implementations, one or more of network node 210, first neighbor node 220, second neighbor node 230, network device 240, and/or device 260 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., an input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
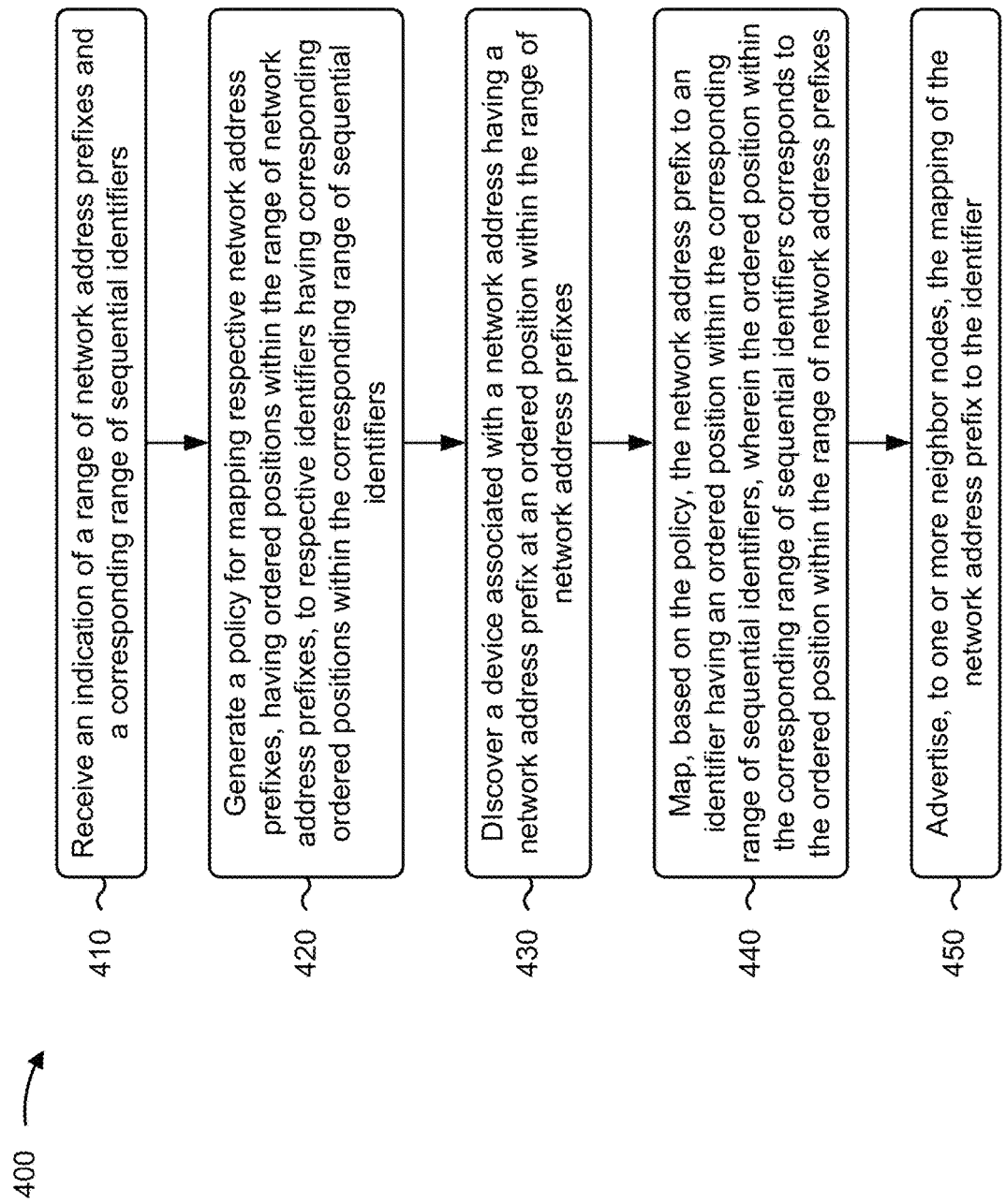

FIG. 4 is a flow chart of an example process 400 for mapping a prefix range to an identifier range. In some implementations, one or more process blocks of FIG. 4 may be performed by a network node (e.g., network node 210). In some implementations, one or more process blocks of FIG. 4 may be performed by another device or a group of devices separate from or including the network node, such as a first neighbor node (e.g., first neighbor node 220), a second neighbor node (e.g., second neighbor node 230), a network device (e.g., network device 240), and/or the like.

As shown in FIG. 4, process 400 may include receiving an indication of a range of network address prefixes and a corresponding range of sequential identifiers (block 410). For example, the network node (e.g., using processor 310, memory 315, storage component 320, input component 325, output component 330, communication interface 335, controller 370, and/or the like) may receive an indication of a range of network address prefixes and a corresponding range of sequential identifiers, as described above.

As further shown in FIG. 4, process 400 may include generating a policy for mapping respective network address prefixes, having ordered positions within the range of network address prefixes, to respective identifiers having corresponding ordered positions within the corresponding range of sequential identifiers (block 420). For example, the network node (e.g., using processor 310, memory 315, storage component 320, input component 325, output component 330, communication interface 335, controller 370, and/or the like) may generate a policy for mapping respective network address prefixes, having ordered positions within the range of network address prefixes, to respective identifiers having corresponding ordered positions within the corresponding range of sequential identifiers, as described above.

As further shown in FIG. 4, process 400 may include discovering a device associated with a network address having a network address prefix at an ordered position within the range of network address prefixes (block 430). For example, the network node (e.g., using processor 310, memory 315, storage component 320, input component 325, output component 330, communication interface 335, controller 370, and/or the like) may discover a device associated with a network address having a network address prefix at an ordered position within the range of network address prefixes, as described above.

As further shown in FIG. 4, process 400 may include mapping, based on the policy, the network address prefix to an identifier having an ordered position within the corresponding range of sequential identifiers, wherein the ordered position within the corresponding range of sequential identifiers corresponds to the ordered position within the range of network address prefixes (block 440). For example, the network node (e.g., using processor 310, memory 315, storage component 320, input component 325, output component 330, communication interface 335, controller 370, and/or the like) may map, based on the policy, the network address prefix to an identifier having an ordered position within the corresponding range of sequential identifiers, as described above. In some implementations, the ordered position within the corresponding range of sequential identifiers corresponds to the ordered position within the range of network address prefixes.

As further shown in FIG. 4, process 400 may include advertising, to one or more neighbor nodes, the mapping of the network address prefix to the identifier (block 450). For example, the network node (e.g., using processor 310, memory 315, storage component 320, input component 325, output component 330, communication interface 335, controller 370, and/or the like) may advertise, to one or more neighbor nodes, the mapping of the network address prefix to the identifier, as described above.

Process 400 may include additional implementations, such as any single implementation or any combination of implementations described below and/or in connection with one or more other processes described elsewhere herein.

In a first implementation, process 400 further include: receiving, from a neighbor node of the one or more neighbor nodes, a data packet comprising the identifier; and forwarding, based on the data packet comprising the identifier, the data packet toward the device associated with the network address.

In a second implementation, alone or in combination with the first implementation, the identifier comprises a multi-protocol label switching (MPLS) label for use in an MPLS domain.

In a third implementation, alone or in combination with one or more of the first and second implementations, the identifier comprises a segment routing identifier for use in a network of nodes implementing segment routing procedures.

In a fourth implementation, alone or in combination with one or more of the first through third implementations, the range of network address prefixes corresponds to the corresponding range of sequential identifiers with a one-to-one correlation.

In a fifth implementation, alone or in combination with one or more of the first through fourth implementations, the network node is a label edge router or a label switch router.

In a sixth implementation, alone or in combination with one or more of the first through fifth implementations, mapping the network address prefix to the identifier comprises: determining an index of the network address prefix within the range of network address prefixes, determining the identifier based on a sum of the index and a lowest-ordered identifier, and binding the network address prefix to the identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for mapping a prefix range to an identifier range. In some implementations, one or more process blocks of FIG. 5 may be performed by a network node (e.g., network node 210). In some implementations, one or more process blocks of FIG. 5 may be performed by another device or a group of devices separate from or including the network node, such as a first neighbor node (e.g., first neighbor node 220), a second neighbor node (e.g., second neighbor node 230), a network device (e.g., network device 240), and/or the like.

As shown in FIG. 5, process 500 may include receiving, from a network device, an indication of a range of network address prefixes, a prefix length range, and a corresponding range of sequential identifiers (block 510). For example, the network node (e.g., using processor 310, memory 315, storage component 320, input component 325, output component 330, communication interface 335, controller 370, and/or the like) may receive, from a network device, an indication of a range of network address prefixes, a prefix length range, and a corresponding range of sequential identifiers, as described above.

As further shown in FIG. 5, process 500 may include generating a policy for mapping respective network address prefixes, having ordered positions within the range of network address prefixes and having prefix lengths within the prefix length range, to respective identifiers having corresponding ordered positions within the corresponding range of sequential identifiers (block 520). For example, the network node (e.g., using processor 310, memory 315, storage component 320, input component 325, output component 330, communication interface 335, controller 370, and/or the like) may generate a policy for mapping respective network address prefixes, having ordered positions within the range of network address prefixes and having prefix lengths within the prefix length range, to respective identifiers having corresponding ordered positions within the corresponding range of sequential identifiers, as described above.

As further shown in FIG. 5, process 500 may include discovering a device associated with a network address having a network address prefix at an ordered position within the range of network address prefixes and having a prefix length within the prefix length range (block 530). For example, the network node (e.g., using processor 310, memory 315, storage component 320, input component 325, output component 330, communication interface 335, controller 370, and/or the like) may discover a device associated with a network address having a network address prefix at an ordered position within the range of network address prefixes and having a prefix length within the prefix length range, as described above.

As further shown in FIG. 5, process 500 may include mapping, based on the policy, the network address prefix to an identifier having an ordered position within the corresponding range of sequential identifiers, wherein the ordered position within the corresponding range of sequential identifiers corresponds to the ordered position within the range of network address prefixes (block 540). For example, the network node (e.g., using processor 310, memory 315, storage component 320, input component 325, output component 330, communication interface 335, controller 370, and/or the like) may map, based on the policy, the network address prefix to an identifier having an ordered position within the corresponding range of sequential identifiers, as described above. In some implementations, the ordered position within the corresponding range of sequential identifiers corresponds to the ordered position within the range of network address prefixes.

As further shown in FIG. 5, process 500 may include advertising, to one or more neighbor nodes, the mapping of the network address prefix to the identifier (block 550). For example, the network node (e.g., using processor 310, memory 315, storage component 320, input component 325, output component 330, communication interface 335, controller 370, and/or the like) may advertise, to one or more neighbor nodes, the mapping of the network address prefix to the identifier, as described above.

Process 500 may include additional implementations, such as any single implementation or any combination of implementations described below and/or in connection with one or more other processes described elsewhere herein.

In a first implementation, process 500 further includes receiving, from a neighbor node of the one or more neighbor nodes, a data packet comprising the identifier; and forwarding, based on the data packet comprising the identifier, the data packet toward the device associated with the network address.

In a second implementation, alone or in combination with the first implementation, the identifier comprises an MPLS label for use in an MPLS domain.

In a third implementation, alone or in combination with one or more of the first and second implementations, the identifier comprises a segment routing identifier for use in a network of nodes implementing segment routing procedures.

In a fourth implementation, alone or in combination with one or more of the first through third implementations, the range of network address prefixes comprises a range of internet protocol prefixes using internet protocol version 4.

In a fifth implementation, alone or in combination with one or more of the first through fourth implementations, the range of network address prefixes corresponds to the corresponding range of sequential identifiers with a one-to-one correlation.

In a sixth implementation, alone or in combination with one or more of the first through fifth implementations, the network node is a label edge router or a label switch router.

In a seventh implementation, alone or in combination with one or more of the first through sixth implementations, process 500 further includes: determining an index of the network address prefix within the range of network address prefixes, wherein the index indicates, for the network address prefix, the ordered position within the range of network address prefixes; determining the identifier based on a sum of the index and a lowest-ordered identifier, wherein the lowest-ordered identifier has lowest-ordered position of the corresponding range of sequential identifiers; and mapping the network address prefix to the identifier.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for mapping a prefix range to an identifier range. In some implementations, one or more process blocks of FIG. 6 may be performed by a network node (e.g., network node 210). In some implementations, one or more process blocks of FIG. 6 may be performed by another device or a group of devices separate from or including the network node, such as a first neighbor node (e.g., first neighbor node 220), a second neighbor node (e.g., second neighbor node 230), a network device (e.g., network device 240), and/or the like.

As shown in FIG. 6, process 600 may include generating a policy for mapping respective network address prefixes, having ordered positions within a range of network address prefixes, to respective identifiers having corresponding ordered positions within a corresponding range of sequential identifiers (block 610). For example, the network node (e.g., using processor 310, memory 315, storage component 320, input component 325, output component 330, communication interface 335, controller 370, and/or the like) may generate a policy for mapping respective network address prefixes, having ordered positions within a range of network address prefixes, to respective identifiers having corresponding ordered positions within a corresponding range of sequential identifiers, as described above.

As further shown in FIG. 6, process 600 may include discovering a device associated with a network address having a network address prefix at an ordered position within the range of network address prefixes (block 620). For example, the network node (e.g., using processor 310, memory 315, storage component 320, input component 325, output component 330, communication interface 335, controller 370, and/or the like) may discover a device associated with a network address having a network address prefix at an ordered position within the range of network address prefixes, as described above.

As further shown in FIG. 6, process 600 may include mapping, based on the policy, the network address prefix to an identifier having an ordered position within the corresponding range of sequential identifiers, wherein the ordered position within the corresponding range of sequential identifiers corresponds to the ordered position within the range of network address prefixes (block 630). For example, the network node (e.g., using processor 310, memory 315, storage component 320, input component 325, output component 330, communication interface 335, controller 370, and/or the like) may map, based on the policy, the network address prefix to an identifier having an ordered position within the corresponding range of sequential identifiers, as described above. In some implementations, the ordered position within the corresponding range of sequential identifiers corresponds to the ordered position within the range of network address prefixes.

As further shown in FIG. 6, process 600 may include advertising, to one or more neighbor nodes, the mapping of the network address prefix to the identifier (block 640). For example, the network node (e.g., using processor 310, memory 315, storage component 320, input component 325, output component 330, communication interface 335, controller 370, and/or the like) may advertise, to one or more neighbor nodes, the mapping of the network address prefix to the identifier, as described above.

As further shown in FIG. 6, process 600 may include receiving, from a neighbor node of the one or more neighbor nodes, a data packet comprising the identifier (block 650). For example, the network node (e.g., using processor 310, memory 315, storage component 320, input component 325, output component 330, communication interface 335, controller 370, and/or the like) may receive, from a neighbor node of the one or more neighbor nodes, a data packet comprising the identifier, as described above.

As further shown in FIG. 6, process 600 may include forwarding, based on the data packet comprising the identifier, the data packet toward the device associated with the network address (block 660). For example, the network node (e.g., using processor 310, memory 315, storage component 320, input component 325, output component 330, communication interface 335, controller 370, and/or the like) may forward, based on the data packet comprising the identifier, the data packet toward the device associated with the network address, as described above.

Process 600 may include additional implementations, such as any single implementation or any combination of implementations described below and/or in connection with one or more other processes described elsewhere herein.

In a first implementation, the identifier comprises an MPLS label for use in an MPLS domain.

In a second implementation, alone or in combination with the first implementation, the identifier comprises a segment routing identifier for use in a network of nodes implementing segment routing procedures.

In a third implementation, alone or in combination with one or more of the first and second implementations, the range of network address prefixes comprises a range of internet protocol prefixes using internet protocol version 4.

In a fourth implementation, alone or in combination with one or more of the first through third implementations, the range of network address prefixes corresponds to the corresponding range of sequential identifiers with a one-to-one correlation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a network node, an indication of a range of network address prefixes and a corresponding range of sequential identifiers;
 generating, by the network node, a policy for mapping respective network address prefixes, having ordered positions within the range of network address prefixes, to respective identifiers having corresponding ordered positions within the corresponding range of sequential identifiers,
  wherein each network address prefix, of the network address prefixes, has a unique ordered position within the range of network address prefixes, and wherein each respective identifier, of the respective identifiers, has a unique ordered position within the corresponding range of sequential identifiers;

discovering, by the network node, a device associated with a network address having a network address prefix at an ordered position within the range of network address prefixes;

mapping, by the network node and based on the policy, the network address prefix to an identifier having an ordered position within the corresponding range of sequential identifiers, wherein the ordered position within the corresponding range of sequential identifiers corresponds to the ordered position within the range of network address prefixes, wherein mapping the network address prefix to the identifier comprises:

determining whether the network address prefix is within the range of network address prefixes based on a length of the network address prefix, and determining an index of the network address prefix within the range of network address prefixes based on a first sum of a base index and an index offset, wherein the base index is defined based on the length of the network address prefix, and wherein the index offset is defined based on the length of the network address prefix; and advertising, by the network node and to one or more neighbor nodes, the mapping of the network address prefix to the identifier.

2. The method of claim 1, further comprising:

receiving, from a neighbor node of the one or more neighbor nodes, a data packet comprising the identifier; and forwarding, based on the data packet comprising the identifier, the data packet toward the device associated with the network address.

3. The method of claim 1, wherein the identifier comprises a multiprotocol label switching (MPLS) label for use in an MPLS domain.

4. The method of claim 1, wherein the identifier comprises a segment routing identifier for use in a network of nodes implementing segment routing procedures.

5. The method of claim 1, wherein the range of network address prefixes corresponds to the corresponding range of sequential identifiers with a one-to-one correlation.

6. The method of claim 1, wherein the network node is a label edge router or a label switch router.

7. The method of claim 1, wherein mapping the network address prefix to the identifier comprises:

determining the identifier based on a second sum of the index and a lowest-ordered identifier, wherein the index indicates, for the network address prefix, the ordered position within the range of network address prefixes, and wherein the lowest-ordered identifier has a lowest-ordered position of the corresponding range of sequential identifiers; and binding the network address prefix to the identifier.

8. A network node, comprising:

one or more memories; and one or more processors to:

receive, from a network device, an indication of a range of network address prefixes, a prefix length range, and a corresponding range of sequential identifiers;

generate a policy for mapping respective network address prefixes, having ordered positions within the range of network address prefixes and having prefix lengths within the prefix length range, to respective identifiers having corresponding ordered positions within the corresponding range of sequential identifiers, wherein each network address prefix, of the network address prefixes, has a unique ordered position within the range of network address prefixes, and wherein each respective identifier, of the respective identifiers, has a unique ordered position within the corresponding range of sequential identifiers;

discover a device associated with a network address having a network address prefix at an ordered position within the range of network address prefixes and having a prefix length within the prefix length range;

map, based on the policy, the network address prefix to an identifier having an ordered position within the corresponding range of sequential identifiers, wherein the ordered position within the corresponding range of sequential identifiers corresponds to the ordered position within the range of network address prefixes, wherein the one or more processors, to map the network address prefix to the identifier, are configured to:

determine whether the network address prefix is within the range of network address prefixes based on a length of the network address prefix, and determine an index of the network address prefix within the range of network address prefixes based on a first sum of a base index and an index offset, wherein the base index is defined based on the length of the network address prefix, and wherein the index offset is defined based on the length of the network address prefix; and advertise, to one or more neighbor nodes, the mapping of the network address prefix to the identifier.

9. The network node of claim 8, wherein the one or more processors are further to:

receive, from a neighbor node of the one or more neighbor nodes, a data packet comprising the identifier; and forward, based on the data packet comprising the identifier, the data packet toward the device associated with the network address.

10. The network node of claim 8, wherein the identifier comprises a multiprotocol label switching (MPLS) label for use in an MPLS domain.

11. The network node of claim 8, wherein the identifier comprises a segment routing identifier for use in a network of nodes implementing segment routing procedures.

12. The network node of claim 8, wherein the range of network address prefixes comprises a range of internet protocol prefixes using internet protocol version 4.

13. The network node of claim 8, wherein the range of network address prefixes corresponds to the corresponding range of sequential identifiers with a one-to-one correlation.

14. The network node of claim 8, wherein the network node is a label edge router or a label switch router.

15. The network node of claim 8, wherein one or more processors are further to:

determine the identifier based on a second sum of the index and a lowest-ordered identifier, wherein the index indicates, for the network address prefix, the ordered position within the range of network address prefixes, and wherein the lowest-ordered identifier has lowest-ordered position of the corresponding range of sequential identifiers; and map the network address prefix to the identifier.

16. A non-transitory computer-readable medium storing instructions, the instructions comprising:
one or more instructions that, when executed by one or more processors, cause the one or more processors to:
generate a policy for mapping respective network address prefixes, having ordered positions within a range of network address prefixes, to respective identifiers having corresponding ordered positions within a corresponding range of sequential identifiers,
wherein each network address prefix, of the network address prefixes, has a unique ordered position within the range of network address prefixes, and
wherein each respective identifier, of the respective identifiers, has a unique ordered position within the corresponding range of sequential identifiers;
discover a device associated with a network address having a network address prefix at an ordered position within the range of network address prefixes;
map, based on the policy, the network address prefix to an identifier having an ordered position within the corresponding range of sequential identifiers,
wherein the ordered position within the corresponding range of sequential identifiers corresponds to the ordered position within the range of network address prefixes,
wherein the one or more instructions, that cause the one or more processors to map the network address prefix to the identifier, cause the one or more processors to:
determine whether the network address prefix is within the range of network address prefixes based on a length of the network address prefix, and
determine an index of the network address prefix within the range of network address prefixes based on a first sum of a base index and an index offset,
wherein the base index is defined based on the length of the network address prefix, and
wherein the index offset is defined based on the length of the network address prefix;
advertise, to one or more neighbor nodes, the mapping of the network address prefix to the identifier;
receive, from a neighbor node of the one or more neighbor nodes, a data packet comprising the identifier; and
forward, based on the data packet comprising the identifier, the data packet toward the device associated with the network address.

17. The non-transitory computer-readable medium of claim 16, wherein the identifier comprises a multiprotocol label switching (MPLS) label for use in an MPLS domain.

18. The non-transitory computer-readable medium of claim 16, wherein the identifier comprises a segment routing identifier for use in a network of nodes implementing segment routing procedures.

19. The non-transitory computer-readable medium of claim 16, wherein the range of network address prefixes comprises a range of internet protocol prefixes using internet protocol version 4.

20. The non-transitory computer-readable medium of claim 16, wherein the range of network address prefixes corresponds to the corresponding range of sequential identifiers with a one-to-one correlation.

* * * * *